United States Patent
Ehrlich et al.

(10) Patent No.: US 12,455,793 B1
(45) Date of Patent: Oct. 28, 2025

(54) CONTENT-BASED BACKUP POLICIES

(71) Applicant: EON IO LTD., Tel Aviv-Jaffa (IL)

(72) Inventors: Ofir Ehrlich, Tel Aviv (IL); Ron Kimchi, Tel Aviv (IL); Yair Weiss, Givatayim (IL); Benjamin Gruenbaum, Herzliya (IL); Eugene Marin, Ramat Gan (IL); Ilya Surdin, Ramat Gan (IL); Sigal Weiner, Holon (IL); Assaf Natanzon, Tel Aviv (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 18/928,038

(22) Filed: Oct. 27, 2024

(51) Int. Cl.
*G06F 11/14* (2006.01)

(52) U.S. Cl.
CPC ...... *G06F 11/1461* (2013.01); *G06F 11/1464* (2013.01); *G06F 2201/80* (2013.01)

(58) Field of Classification Search
None
See application file for complete search history.

(56) References Cited

PUBLICATIONS

Amazon, "Amazon Athena User Guide," 2025; 1695 pages.
Amazon, "Amazon EBS snapshots," 2025; 1 page; accessed via web at https://docs.aws.amazon.com/ebs/latest/userguide/ebs-snapshots.html.
Amazon, "Amazon What is AWS Glue?," 2025; 4 pages; accessed via web at https://docs.aws.amazon.com/glue/latest/dg/what-is-glue.html.
Amazon, "How Amazon EBS Snapshots Work," 2025; 3 pages; accessed via web at https://docs.aws.amazon.com/ebs/latest/userguide/how_snapshots_work.html.
Levy, Eran, "What is the Parquet File Format? Use Cases & Benefits," Upsolver; Apr. 20, 2023; 5 pages; accessed via web at https://www.upsolver.com/blog/apache-parquet-why-use.
Parquet, "File Format Documentation about the Parquet File Format.," 2025; 1 page; accessed via web at https://parquet.apache.org/docs/file-format/.
Parquet, "Overview All about Parquet," 2025; 2 pages; accessed via web at https://parquet.apache.org/docs/overview/.
Rubrik, "Exploring the Depth of Simplicity: Protecting Microsoft SQL Server with Rubrik," Technical White Paper; Mar. 2017; 15 pages.
Rubrik, "Protecting Microsoft SQL Server with Rubrik," Rubrik Technical Marketing; Technical White Paper; Sep. 2023; 31 pages.
Siddiqui, Laiba, "Apache Parquet Explained: A Guide for Data Professionals," datacamp; Feb. 10, 2025; 10 pages; accessed via web at https://www.datacamp.com/tutorial/apache-parquet.

*Primary Examiner* — Eddy Cheung
(74) *Attorney, Agent, or Firm* — M&B IP Analysts, LLC

(57) ABSTRACT

A method includes probing one or more accounts on a cloud infrastructure so as to identify content of multiple data resources hosted by the cloud infrastructure in association with the accounts, receiving, from a user of the accounts, a backup policy specifying one or more backup parameters and at least one set of one or more data-resource properties, identifying, based on the identified content, at least some of the data resources that have the data-resource properties, and backing up the identified data resources in accordance with the backup parameters. Other embodiments are also described.

20 Claims, 3 Drawing Sheets

CONTENT-BASED BACKUP POLICIES

CROSS-REFERENCE TO RELATED APPLICATIONS

The present application is related to U.S. Non-Provisional application Ser. No. 18/928,039, filed on Oct. 27, 2024 entitled "Content-based backup posture controls." The contents of which are hereby incorporated by reference.

FIELD OF EMBODIMENTS OF THE INVENTION

Embodiments of the present invention relate generally to data resources on a cloud infrastructure, and specifically to the backup of such resources.

BACKGROUND

A cloud infrastructure includes hardware and software components for supporting cloud computing. Examples of cloud infrastructures include Amazon Web Services, Microsoft Azure, and Google Cloud Platform. After opening an account on a cloud infrastructure, a user can associate data resources, such as databases or virtual machines, with the account. The data resources are then hosted by the cloud infrastructure in association with the account.

In some cases, backing up a data resource includes taking a snapshot of the resource (e.g., periodically) and copying the snapshot to another location. Alternatively, other techniques, such as using an agent to copy directly from the data resource, are used.

SUMMARY

There is provided, in accordance with some embodiments of the present invention, a system including a communication interface and one or more processors. The processors are configured to probe one or more accounts on a cloud infrastructure so as to identify content of multiple data resources hosted by the cloud infrastructure in association with the accounts, to receive via the communication interface, from a user of the accounts, a backup policy specifying one or more backup parameters and at least one set of one or more data-resource properties, to identify, based on the identified content, at least some of the data resources that have the data-resource properties, and to back up the identified data resources in accordance with the backup parameters.

There is further provided, in accordance with some embodiments of the present invention, a method including probing one or more accounts on a cloud infrastructure so as to identify content of multiple data resources hosted by the cloud infrastructure in association with the accounts, receiving, from a user of the accounts, a backup policy specifying one or more backup parameters and at least one set of one or more data-resource properties, identifying, based on the identified content, at least some of the data resources that have the data-resource properties, and backing up the identified data resources in accordance with the backup parameters.

There is further provided, in accordance with some embodiments of the present invention, a computer software product including a tangible non-transitory computer-readable medium in which program instructions are stored. The instructions, when read by one or more processors, cause the processors to probe one or more accounts on a cloud infrastructure so as to identify content of multiple data resources hosted by the cloud infrastructure in association with the accounts, to receive, from a user of the accounts, a backup policy specifying one or more backup parameters and at least one set of one or more data-resource properties, to identify, based on the identified content, at least some of the data resources that have the data-resource properties, and to back up the identified data resources in accordance with the backup parameters.

In some embodiments, the instructions cause the processors to periodically probe the accounts.

In some embodiments, the instructions cause the processors to identify at least some of the data resources that have the data-resource properties by identifying at least some of the data resources that store a particular class of data.

In some embodiments, the class of data is selected from the group of classes consisting of: personally identifiable information, financial information, and protected health information.

In some embodiments, by virtue of specifying the data-resource properties, the backup policy conditions applying the backup parameters on a sensitivity of data stored in each of the data resources.

In some embodiments, the instructions cause the processors to identify at least some of the data resources that have the data-resource properties by identifying at least some of the data resources that run in a particular type of runtime environment.

In some embodiments, the type of runtime environment is selected from the group of types consisting of: production, development, and testing.

In some embodiments, the instructions cause the processors to identify at least some of the data resources that have the data-resource properties by identifying at least some of the data resources that run a particular application or type of application.

In some embodiments, the content includes metadata variables associated with applications running on the data resources.

In some embodiments, the content includes metadata variables that indicate respective network configurations of the data resources.

In some embodiments, the content includes respective names of files stored in the data resources.

In some embodiments, the content includes content of files stored in the data resources.

In some embodiments, the data resources include one or more databases, and the content includes respective names of tables in the databases.

In some embodiments, the data resources include one or more databases, and the content includes respective names of fields in tables in the databases.

In some embodiments, the instructions cause the processors to identify the content by:
taking respective snapshots of the data resources, and
mounting and then scanning the snapshots.

In some embodiments, scanning the snapshots includes scanning one or more predefined storage locations at which a particular application or type of application is typically installed.

There is further provided, in accordance with some embodiments of the present invention, a system including a communication interface and one or more processors. The processors are configured to probe one or more accounts on a cloud infrastructure so as to identify content of multiple data resources hosted by the cloud infrastructure in association with the accounts, to receive via the communication interface, from a user of the accounts, a backup posture control specifying one or more backup requirements and at least one set of one or more data-resource properties, to identify, based on the identified content, at least some of the data resources that have the data-resource properties, to ascertain whether each of the identified data resources is backed up in accordance with the backup requirements, and to output a warning in response to any one of the identified data resources not being backed up in accordance with the backup requirements.

There is further provided, in accordance with some embodiments of the present invention, a method including probing one or more accounts on a cloud infrastructure so as to identify content of multiple data resources hosted by the cloud infrastructure in association with the accounts, receiving, from a user of the accounts, a backup posture control specifying one or more backup requirements and at least one set of one or more data-resource properties, identifying, based on the identified content, at least some of the data resources that have the data-resource properties, ascertaining whether each of the identified data resources is backed up in accordance with the backup requirements, and in response to any one of the identified data resources not being backed up in accordance with the backup requirements, outputting a warning.

There is further provided, in accordance with some embodiments of the present invention, a computer software product including a tangible non-transitory computer-readable medium in which program instructions are stored. The instructions, when read by one or more processors, cause the processors to probe one or more accounts on a cloud infrastructure so as to identify content of multiple data resources hosted by the cloud infrastructure in association with the accounts, to receive, from a user of the accounts, a backup posture control specifying one or more backup requirements and at least one set of one or more data-resource properties, to identify, based on the identified content, at least some of the data resources that have the data-resource properties, to ascertain whether each of the identified data resources is backed up in accordance with the backup requirements, and to output a warning in response to any one of the identified data resources not being backed up in accordance with the backup requirements.

In some embodiments, the instructions cause the processors to periodically probe the accounts.

In some embodiments, the instructions cause the processors to identify at least some of the data resources that have the data-resource properties by identifying at least some of the data resources that store a particular class of data.

In some embodiments, the class of data is selected from the group of classes consisting of: personally identifiable information, financial information, and protected health information.

In some embodiments, by virtue of specifying the data-resource properties, the backup posture control conditions applying the backup requirements on a sensitivity of data stored in each of the data resources.

In some embodiments, the instructions cause the processors to identify at least some of the data resources that have the data-resource properties by identifying at least some of the data resources that run in a particular type of runtime environment.

In some embodiments, the type of runtime environment is selected from the group of types consisting of: production, development, and testing.

In some embodiments, the instructions cause the processors to identify at least some of the data resources that have the data-resource properties by identifying at least some of the data resources that run a particular application or type of application.

In some embodiments, the instructions cause the processors to identify the content by:
taking respective snapshots of the data resources, and
mounting and then scanning the snapshots.

In some embodiments, scanning the snapshots includes scanning one or more predefined storage locations at which a particular application or type of application is typically installed.

In some embodiments, the data resources are automatically backed up in accordance with one or more backup policies, such that the warning indicates a need to modify the backup policies.

In some embodiments, the backup requirements include a constraint on a parameter selected from the group of parameters consisting of: a retention of a backup, a destination of a backup, a number of backup copies, and a lockedness of a backup.

The present invention will be more fully understood from the following detailed description of embodiments thereof, taken together with the drawings, in which:

DETAILED DESCRIPTION

Overview

Figure 1:
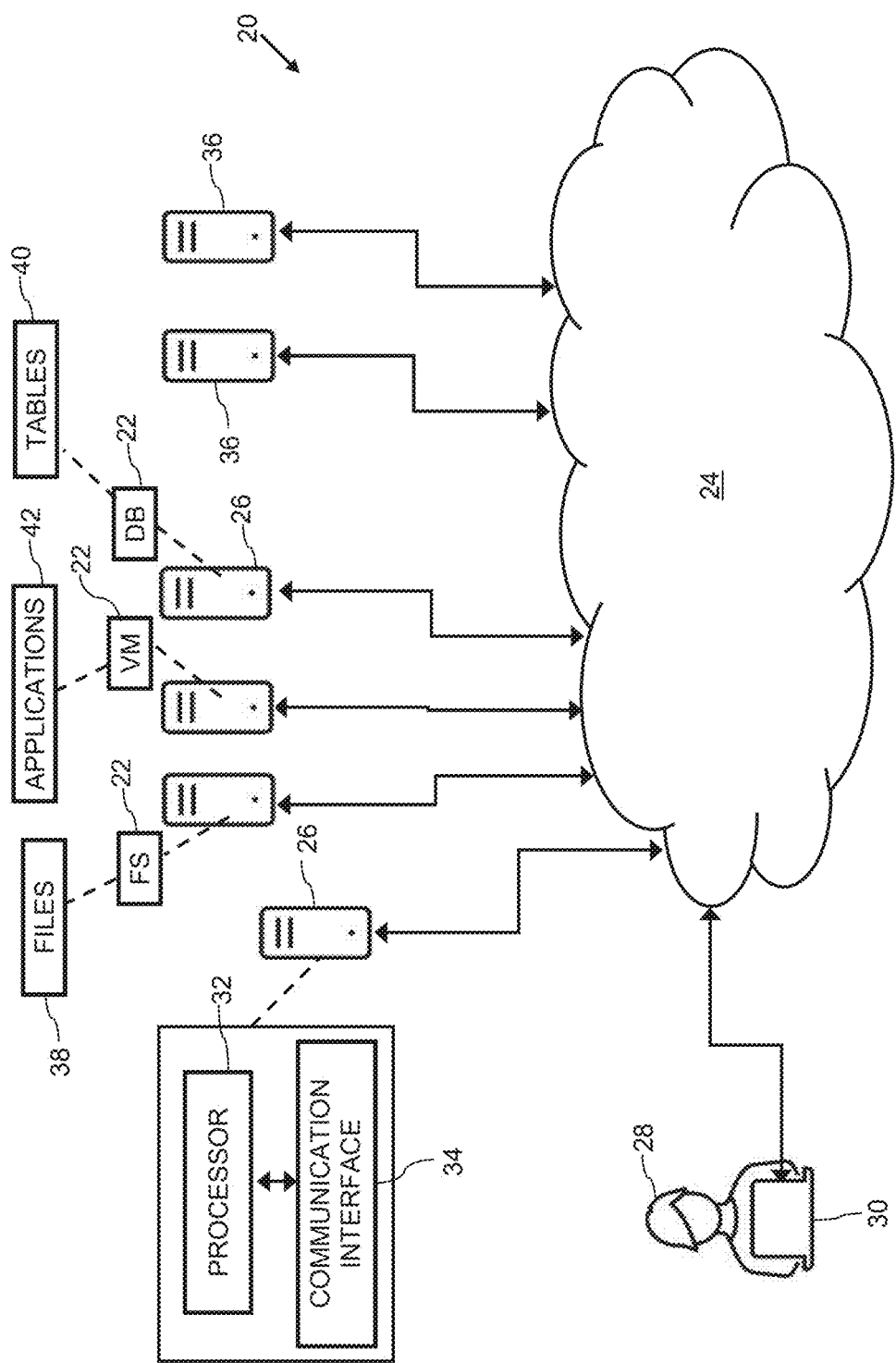
FIG. 1 is a schematic illustration of a system for backing up multiple data resources, in accordance with some embodiments of the present invention.

Typically, data resources on a cloud infrastructure are automatically backed up in accordance with a user-defined backup policy. The backup policy includes one or more parameters such as the frequency with which the backup is to occur, the number of backup copies to be made, and the location(s) at which the backup copies are to be stored.

Conventionally, the data resources included in a backup policy are those specified explicitly by the user, those that possess general properties specified by the user, such as the property of being of a particular type, and/or those that have been tagged by the user with a particular tag. However, in many cases, more flexibility is required. For example, the user may wish to include only data resources that store a particular class of data (e.g., sensitive data), run in a particular type of runtime environment (e.g., a production environment), and/or run a particular type of application. Even if the user could somehow identify the data resources that satisfy these conditions, manually tagging these resources might be impractical. Moreover, the set of data resources satisfying these conditions might change over time.

To address this challenge, embodiments of the present invention provide content-based backup policies in which data resources are included based on the content of the data resources, rather than merely based on general properties or tags. To facilitate defining such a policy, one or more processors probe the user's accounts on the cloud infrastructure, typically periodically, so as to identify the data resources hosted by the cloud infrastructure in association with the accounts and, in addition, the content of these data resources. For example, the processors may identify classes of data stored in the data resources, applications installed on the data resources, and/or metadata variables saved on the data resources. Based on the identified content, the processors identify the data resources to be included in the policy, and back up the identified data resources in accordance with the specified backup parameters.

In many cases, it is desired that each data resource be backed up in accordance with any relevant requirements (or "rules"). For example, due to regulatory requirements, there may be constraints on the geographic regions in which sensitive data may be stored. As another example, a requirement may stipulate that at least one backup copy be in a different geographic region from the data resource. However, it is often prohibitively difficult to ascertain, manually, whether each data resource is backed up in accordance with the relevant requirements.

To address this challenge, embodiments of the present invention provide content-based backup posture controls, each of which includes one or more backup requirements. In addition to probing the user's accounts as described above, the processors identify the data resources to be included in the backup posture control based on the content of the data resources. The processors then ascertain whether each of the data resources included in the backup posture control is backed up in accordance with the backup requirements. In response to any one of the data resources not being backed up in accordance with the backup requirements, the processors output a warning.

In some embodiments, content-based backup posture controls are used in combination with content-based backup policies. For example, in some cases, a backup requirement may be missed during the definition of the policies, e.g., due to the large number and/or complexity of the policies, due to the large number and/or complexity of the backup requirements, or due to the backup requirement not having been relevant when the policy was defined. The content-based backup posture controls facilitate modifying the policies (e.g., adding a policy and/or modifying an existing policy) to account for the missed requirement.

For example, in one hypothetical scenario, a user defines a backup policy specifying that all European data resources running Microsoft Windows should be backed up to the United States, without accounting for regulation forbidding European-sourced personally identifiable information from being stored outside of Europe. For example, such regulation may be issued only after the policy is defined, the user may incorrectly assume that no European data resources running Microsoft Windows will ever contain personally identifiable information, or the user may simply forget about the regulation. Even if the user were to define another backup policy specifying that all European data resources containing personally identifiable information should be backed up to Europe, a data resource running Microsoft Windows and containing personally identifiable information might nonetheless be backed up to the United States per the former backup policy. Hence, the user defines a backup posture control stipulating that no European-sourced personally identifiable information is to be backed up outside of Europe. Based on the execution of this backup posture control, the user can identify the problem with the former backup policy, and then correct this problem by excluding data resources containing personally identifiable information from the policy.

In other embodiments, content-based backup posture controls are used independently from content-based backup policies. For example, content-based backup posture controls may be particularly helpful for cases in which at least some backups are performed manually and/or with conventional (e.g., tag-based) backup policies that cannot effectively handle content-based requirements such as a requirement that no European-sourced personally identifiable information be stored outside of Europe.

System Description

Reference is initially made to FIG. 1, which is a schematic illustration of a system 20 for backing up multiple data resources 22, in accordance with some embodiments of the present invention.

Data resources 22 are hosted by a cloud infrastructure 24 in association with one or more accounts. For example, FIG. 1 shows several types of data resources 22 residing on servers 26 belonging to cloud infrastructure 24. (It is noted that a single data resource may be distributed across multiple servers 26, and that a user 28 of the accounts typically does not know which server(s) user 28 is using.) Servers 26 comprise respective processors 32 and respective communication interfaces 34, such as respective network interface controllers, via which processors 32 exchange communication as described herein. Data resources 22 may include, for example, one or more file systems (FSs), virtual machines (VMs), databases (DBs) containing tables 40, and/or web services.

Typically, the backup-related functionality described herein is performed cooperatively by processors 32, by executing suitable cloud-computing software. To facilitate this, user 28 provides access to the accounts to the software, e.g., by entering the account IDs and passwords into a web application running on a device 30. In addition, as further described below, user 28 provides to the software, e.g., via the web application, instructions including one or more backup policies and/or backup posture controls. In some such embodiments, the data and instructions entered by the user are communicated to servers 26 via one or more servers on another cloud infrastructure and/or one or more servers that are not cloud-based, which manage the backup-related functionality described herein.

Based on access to the accounts provided by user 28, processors 32 probe the accounts so as to identify data resources 22 (i.e., to identify which data resources are associated with the accounts) and, in addition, content of data resources 22. Typically, the probing is performed periodically, e.g., at least once daily. Typically, the processors identify the content by taking respective snapshots of data resources 22, mounting the snapshots, and then scanning the snapshots. Alternatively, the processors identify the content by scanning the data resources directly, using one or more agents installed on servers 26.

In some embodiments, the identified content includes content of files 38 stored in the data resources, such as in a file system. Alternatively or additionally, the identified content includes the respective names of files 38, which may indicate, for example, the type of content in the files and/or the type of environment (e.g., production, development, or testing) in which the files are used.

Alternatively or additionally, the identified content includes content of tables 40 contained in databases 22. Alternatively or additionally, the identified content includes respective names of tables 40 and/or respective names of fields in tables 40, which may indicate, for example, the type of content in the tables and/or the type of environment (e.g., production, development, or testing) in which the tables are used.

Alternatively or additionally, the identified content includes one or more applications 42 installed on the data resources, such as on a virtual machine. Alternatively or additionally, the identified content includes metadata variables associated with applications 42. Such variables may, for example, identify applications 42, indicate the type of environment (e.g., production, development, or testing) in which each application 42 runs, and/or indicate other information associated with the applications, such as the name of a database running in a database application.

Alternatively or additionally, the identified content includes metadata variables that indicate respective network configurations of the data resources. The network configurations may, for example, indicate the type of environment (e.g., production, development, or testing) in which each data resource is used.

In some embodiments, to identify whether a particular application or type of application 42 is installed, the processors scan one or more predefined storage locations at which the particular application or type of application is typically installed. For example, on an Amazon Elastic Compute Cloud (EC2) instance running a Linux distribution, the configuration files for the database application MySQL are typically installed at /etc/mysql/ or /etc/my.cnf, the binary files are typically installed at /usr/bin/ or /usr/sbin/, and the log files are typically installed at /var/log/mysql/. Alternatively or additionally, to identify data used by a particular application or type of application, the processors scan one or more storage locations at which the data is typically stored. For example, on an EC2 instance running a Linux distribution, the data directory for MySQL is typically /var/lib/mysql/.

Alternatively or additionally, while identifying the content of data resources 22, the processors classify the content. For example, in some embodiments, the processors classify data in a file or database as sensitive, e.g., by virtue of including personally identifiable information, financial information, and/or protected health information. For example, in some embodiments, the processors use Microsoft Presidio, an open-source library with code for detecting sensitive data, to classify the data.

Following each probing, processors 32 store information describing the content of each data resource 22. Subsequently, the processors use this information to execute one or more backup policies and/or backup posture controls, as described in detail below. (In some cases, an initial probing of the user's accounts is performed only after a backup policy and/or backup posture control has been defined.) In executing the backup policies, the processors create backups of data resources 22. The backups are typically stored on destination servers 36, each of which may be hosted by cloud infrastructure 24 and/or any other cloud infrastructure, in association with any account.

Typically, as described above, the functionality of each processor 32 is implemented in software. For example, in some embodiments, each processor 32 is embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Alternatively to processors 32, the backup-related functionality described herein may be performed by any other single processor, such as a processor of device 30 or of a server that is not cloud-based, or any other cooperatively networked or clustered set of processors, such as the respective processors of servers on another cloud infrastructure or servers that are not cloud-based. Optionally, this functionality may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software, as described above for processors 32.

Backup Policies

In some embodiments, in addition to providing access to the user's accounts on cloud infrastructure 24, user 28 defines one or more backup policies. Each backup policy specifies one or more backup parameters and at least one set of one or more data-resource properties. Processors 32 are configured to receive the backup policy from the user. Based on the identified content of data resources 22, processors 32 identify at least some of the data resources that have the specified data-resource properties. The processors then back up the identified data resources in accordance with the backup parameters.

Figure 2:
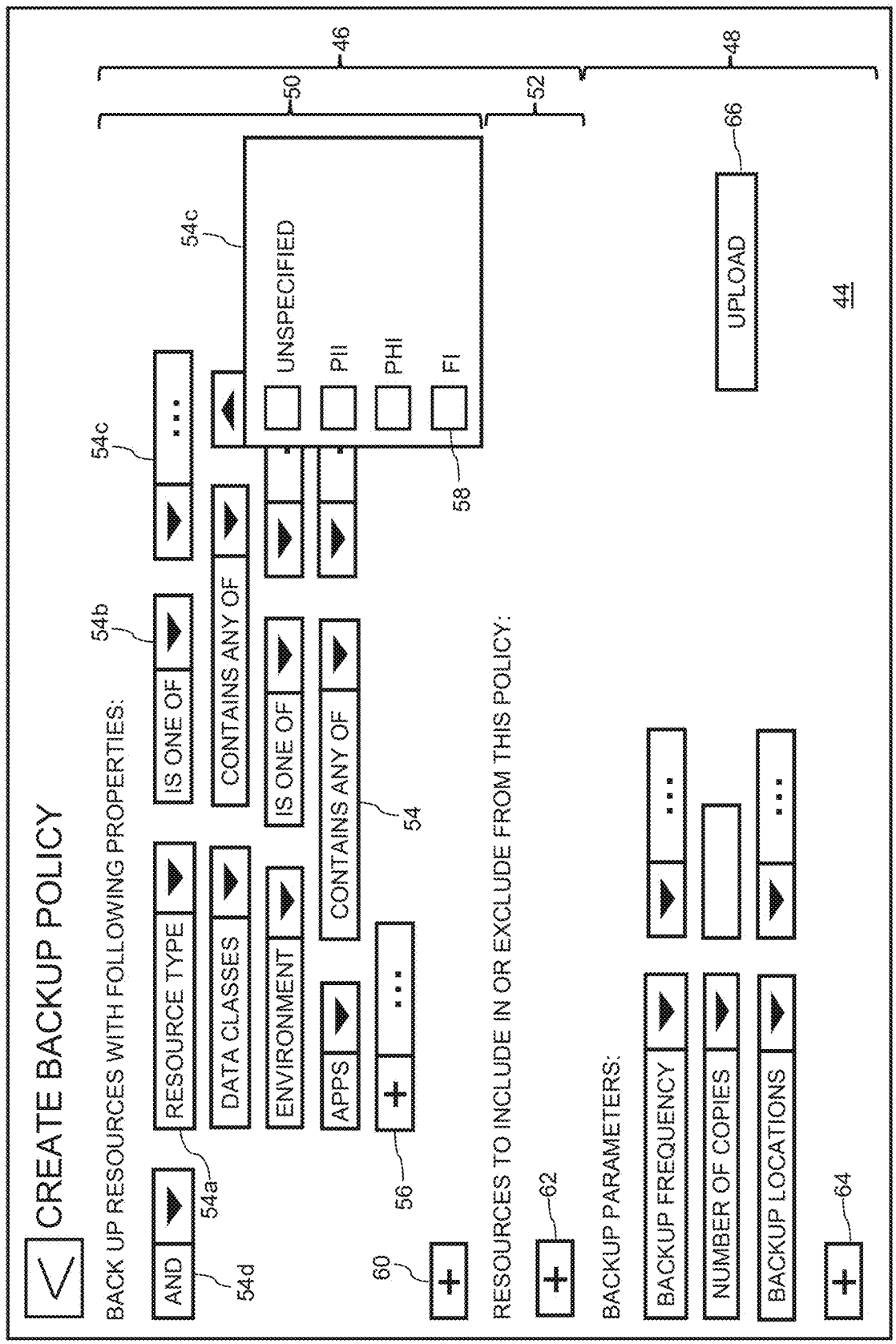
FIG. 2 is a schematic illustration of an example user interface for creating a backup policy, in accordance with some embodiments of the present invention.

By way of illustration, reference is now made to FIG. 2, which is a schematic illustration of an example user interface 44 for creating a backup policy, in accordance with some embodiments of the present invention. In some embodiments, user interface 44, or any suitable variation thereof, is displayed on device 30 (FIG. 1). The user uses the user interface to create (or "define") a backup policy, and the backup policy is then uploaded to the processors from device 30, e.g., in response to the user hitting an upload button 66. In some embodiments, user interface 44 includes multiple dropdown menus 54 for use in defining the backup policy.

In some embodiments, user interface 44 includes a first section 46, in which the user can specify information to be used for determining the data resources to be included in the policy, and a second section 48, in which the user can define the backup parameters to be applied to these data resources. In some embodiments, first section 46 includes a first sub-section 50, in which the user can specify one or more sets of data-resource properties, and a second sub-section 52, in which the user can specify (explicitly) any data resources to be included in or excluded from the policy. The data resources included in the policy are those having all the properties of any one of the sets of data-resource properties, subject to any inclusions and/or exclusions specified in second sub-section 52.

In some embodiments, for each set of data-resource properties, user interface 44 includes a button 56. In response to the user pressing button 56, the user interface adds three dropdown menus 54, via which the user can define a new property: a first menu 54a for selecting the property type, a second menu 54b for selecting a type of condition on the property type, and a third menu 54c for selecting the condition. For example, one possible data-resource property is that the data resource is of type database or virtual machine. To specify such a property, the user can specify "resource type" in first menu 54a, specify "is one of" in second menu 54b, and check respective checkboxes for "database" and "virtual machine" in third menu 54c.

In some embodiments, a button 60 allows the user to add a new set of properties. Alternatively or additionally, by toggling a dropdown menu 54d from "AND" to "OR," the user can assign each property to its own set. For example, it will be supposed that a first set of properties initially includes a property P1, and the user then adds a property P2. If P2 is added while dropdown menu 54d is set to "AND," any data resource included in the backup policy would need to have both P1 and P2. On the other hand, if P2 is added while dropdown menu 54d is set to "OR," the data resource could have either P1 or P2.

Optionally, one of the data-resource properties is the property of containing a particular class of data. In some embodiments, as shown in FIG. 2, checkboxes 58 in the relevant dropdown menu 54c allow the user to specify the class of data. Examples of data classes include personally identifiable information (PII), protected health information (PHI), and financial information (FI). Another, more general example is sensitive data, this class being defined, for example, as the union of two or more sub-classes such as personally identifiable information, protected health information, or financial information, such that a data resource is considered to contain sensitive data if the data resource contains data belonging to any one of the sub-classes. In other words, in some embodiments, by virtue of specifying the data-resource properties, the backup policy conditions applying the backup parameters on the sensitivity of data stored in each of the data resources.

Alternatively or additionally, one of the data-resource properties is the property of running in a particular type of runtime environment, or in any one of multiple types of runtime environment. Examples of runtime environments include a production environment (e.g., an internal production environment), a development environment, and a testing environment.

Alternatively or additionally, one of the data-resource properties is the property of running a particular application or any one of multiple applications, e.g., any application of a particular type. Examples of types of applications are database applications, message queues, and web applications.

Alternatively or additionally, the data-resource properties include the property of being of a particular type (e.g., the property of being a database), a location-related property (e.g., the property of being located in a particular geographic area), and/or a property relating to the manner in which the data resource is hosted by the cloud infrastructure (e.g., the property of being hosted in a particular account ID, virtual private cloud, or subnet).

In some embodiments, second sub-section 52 includes another button 62 via which the user can manually include resources in the policy or exclude resources from the policy, e.g., based on the user having tagged the resources.

In some embodiments, the backup parameters include a backup frequency, a required number of backup copies, and/or one or more required locations of destination servers 36 (FIG. 1), each location including, for example, a geographic region, a cloud infrastructure, a subnet, and/or an account. In some embodiments, another button 64 allows the user to add backup parameters.

In response to receiving the backup policy, the processors execute the backup policy, e.g., at the frequency specified by the user. During each execution of the backup policy, the processors, based on the identified content of the data resources, identify those of the data resources that have all the data-resource properties of any one of the sets of properties included in the policy, excluding any data resources that were manually excluded by the user. For example, the processors may identify at least some of the data resources that store a particular class of data, at least some of the data resources that run in a particular type of runtime environment, and/or at least some of the data resources that run a particular application or type of application. The processors further identify any data resources that were manually included by the user. The processors then back up the identified data resources in accordance with the backup parameters.

Backup Posture Controls

In some embodiments, alternatively or additionally to creating one or more backup policies, user 28 (FIG. 1) creates one or more backup posture controls. Each posture control specifies one or more backup requirements and at least one set of one or more data-resource properties. Processors 32 are configured to receive the backup posture control from the user. Based on the identified content of the data resources, processors 32 identify at least some of the data resources that have the specified data-resource properties. The processors then ascertain whether each of the identified data resources is backed up in accordance with the backup requirements. In response to any one of the data resources not being backed up in accordance with the backup requirements, the processors output a warning.

In some embodiments, the data resources are automatically backed up in accordance with one or more backup policies (e.g., content-based or conventional backup policies), such that the warning explicitly or implicitly indicates a need to modify the backup policies. For example, in the hypothetical scenario outlined in the Overview, the warning may indicate a need to exclude data resources containing personally identifiable information from a backup policy. Alternatively or additionally, the data resources are manually backed up, such that the warning explicitly or implicitly indicates a need to change the manner in which the data resources are backed up and/or a need to automate the backup process.

Figure 3:
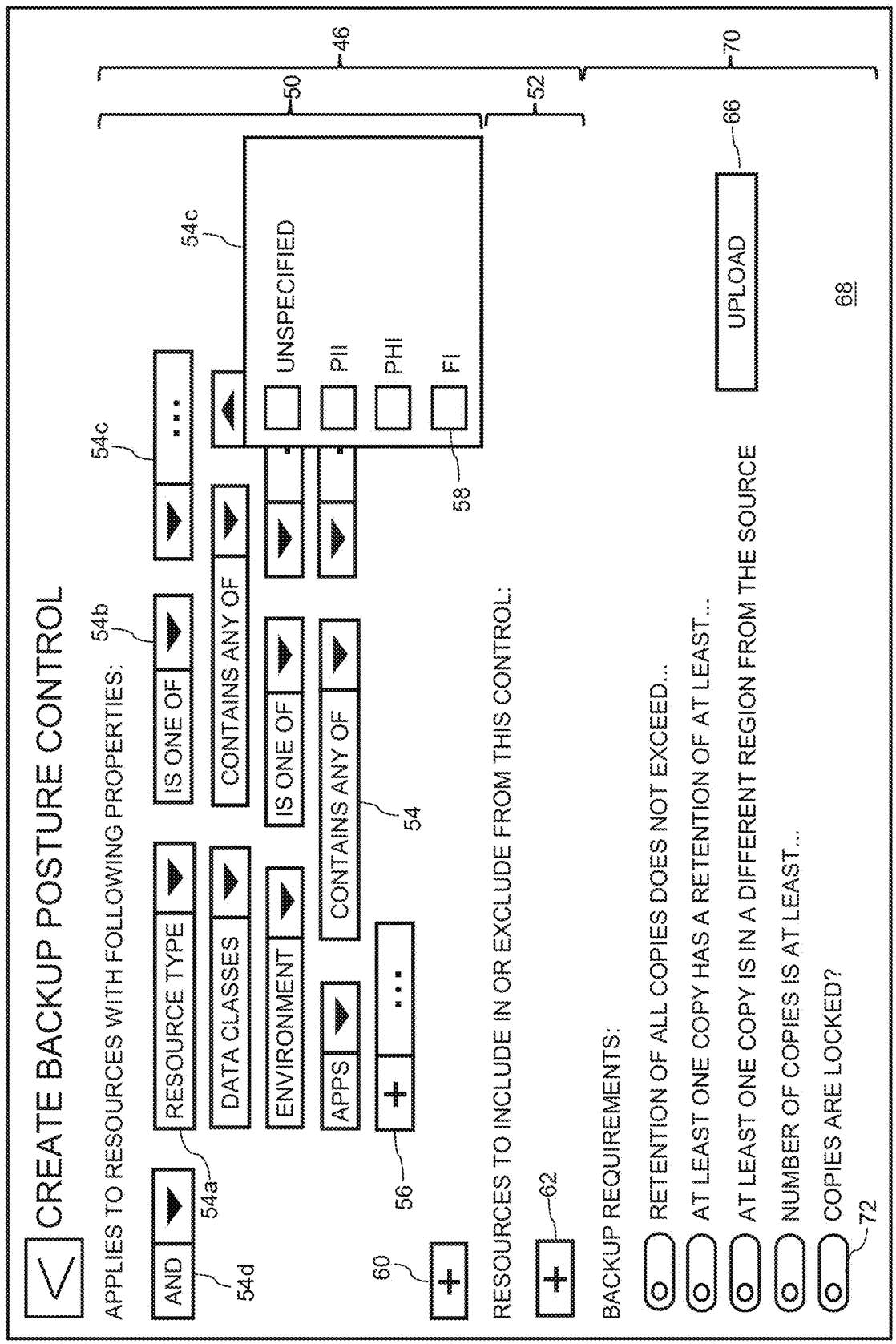
FIG. 3 is a schematic illustration of an example user interface for creating a backup posture control, in accordance with some embodiments of the present invention.

By way of illustration, reference is now made to FIG. 3, which is a schematic illustration of an example user interface 68 for creating a backup posture control, in accordance with some embodiments of the present invention. In some embodiments, user interface 68, or any suitable variation thereof, is displayed on device 30 (FIG. 1). The user uses the user interface to create a backup posture control, and the backup posture control is then uploaded to processors 32 (FIG. 1) from device 30, e.g., in response to the user hitting upload button 66.

In some embodiments, user interface 68 includes first section 46, in which the user can specify information to be used for determining the data resources to be included in the posture control, as explained above for user interface 44 (FIG. 2). (It is noted that, notwithstanding the similarities between FIG. 2 and FIG. 3 with respect to first section 46, the two user interfaces may differ from one another with respect to the layout of first section 46 and/or the manner in which the data-resource properties are specified.)

In some embodiments, user interface 68 further includes a second section 70, in which the user can define the backup requirements to be applied to the data resources included in the posture control. In some embodiments, each requirement is specified by toggling a respective toggle switch 72 and then, if required, entering the parameters of the requirement.

The requirements can include, for example, a constraint on the retention of a backup, such as a stipulation that no backup copies be retained for longer than a particular maximum retention period and/or that at least one copy should be retained for at least a particular minimum retention period. Alternatively or additionally, the requirements can include a constraint on the destination of a backup, such as a stipulation that at least one backup copy be in a particular geographic region, that no copies be in a particular geographic region, or that at least one backup copy be sufficiently isolated from the data source by virtue of being hosted in a different geographic region, hosted in association with a different account ID, or hosted by a different cloud infrastructure. Alternatively or additionally, the requirements can include a constraint on a number of backup copies, such as a stipulation that the number of copies be at least a particular threshold. Alternatively or additionally, the requirements can include a constraint on the lockedness of a backup, i.e., the extent to which the backup copies are protected from modification or deletion.

In response to receiving the backup posture control, the processors execute the backup posture control, e.g., at a predetermined frequency (e.g., once per hour) or a frequency specified by the user. During each execution of the backup posture control, the processors, based on the identified content of the data resources, identify those of the data resources that have all the data-resource properties of any one of the sets of properties included in the control, excluding any data resources that were manually excluded by the user. For example, the processors may identify at least some of the data resources that store a particular class of data, at least some of the data resources that run in a particular type of runtime environment, and/or at least some of the data resources that run a particular application or type of application. The processors further identify any data resources that were manually included by the user. The processors then ascertain whether each of the identified data resources is backed up in accordance with the backup requirements. In response to any one of the data resources not being backed up in accordance with the backup requirements, the processors output a warning. The warning may specify, for example, the identity of the data resource and those of the backup requirements that are not satisfied for the data resource.

Typically, to ascertain whether each of the identified data resources is backed up in accordance with the backup requirements, the processors first identify any backups of the data resources. For example, in some embodiments, the processors perform at least some of the backing up (e.g., by executing content-based backup policies), such that the processors can readily identify the backups. Alternatively or additionally, for embodiments in which backups are performed manually and/or via an external backup service, the processors scan the user's accounts and/or connect to an application programming interface of an external backup service. Subsequently, the processor checks whether the backups conform to the backup requirements.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A system, comprising:
a communication interface; and
one or more processors, configured to:
    probe one or more accounts on a cloud infrastructure so as to identify content of multiple data resources hosted by the cloud infrastructure in association with the accounts,
    receive via the communication interface, from a user of the accounts, a backup policy specifying one or more backup parameters and at least one set of one or more data-resource properties,
    based on the identified content, identify at least some of the data resources that have the data-resource properties, and
    back up the identified data resources in accordance with the backup parameters.

2. A method, comprising:
probing one or more accounts on a cloud infrastructure so as to identify content of multiple data resources hosted by the cloud infrastructure in association with the accounts;
receiving, from a user of the accounts, a backup policy specifying one or more backup parameters and at least one set of one or more data-resource properties;
based on the identified content, identifying at least some of the data resources that have the data-resource properties; and
backing up the identified data resources in accordance with the backup parameters.

3. The method according to claim 2, wherein identifying at least some of the data resources that have the data-resource properties comprises identifying at least some of the data resources that store a particular class of data.

4. The method according to claim 3, wherein the class of data is selected from the group of classes consisting of: personally identifiable information, financial information, and protected health information.

5. The method according to claim 2, wherein identifying at least some of the data resources that have the data-resource properties comprises identifying at least some of the data resources that run in a particular type of runtime environment.

6. The method according to claim 5, wherein the type of runtime environment is selected from the group of types consisting of: production, development, and testing.

7. The method according to claim 2, wherein identifying at least some of the data resources that have the data-resource properties comprises identifying at least some of the data resources that run a particular application or type of application.

8. A computer software product comprising a tangible non-transitory computer-readable medium in which program instructions are stored, which instructions, when read by one or more processors, cause the processors to:
    probe one or more accounts on a cloud infrastructure so as to identify content of multiple data resources hosted by the cloud infrastructure in association with the accounts,
    receive, from a user of the accounts, a backup policy specifying one or more backup parameters and at least one set of one or more data-resource properties,
    based on the identified content, identify at least some of the data resources that have the data-resource properties, and
    back up the identified data resources in accordance with the backup parameters.

9. The computer software product according to claim 8, wherein the instructions cause the processors to periodically probe the accounts.

10. The computer software product according to claim 8, wherein the instructions cause the processors to identify at least some of the data resources that have the data-resource properties by identifying at least some of the data resources that store a particular class of data.

11. The computer software product according to claim 10, wherein the class of data is selected from the group of classes consisting of: personally identifiable information, financial information, and protected health information.

12. The computer software product according to claim 8, wherein, by virtue of specifying the data-resource properties, the backup policy conditions applying the backup parameters on a sensitivity of data stored in each of the data resources.

13. The computer software product according to claim 8, wherein the instructions cause the processors to identify at least some of the data resources that have the data-resource properties by identifying at least some of the data resources that run in a particular type of runtime environment.

14. The computer software product according to claim 13, wherein the type of runtime environment is selected from the group of types consisting of: production, development, and testing.

15. The computer software product according to claim 8, wherein the instructions cause the processors to identify at least some of the data resources that have the data-resource properties by identifying at least some of the data resources that run a particular application or type of application.

16. The computer software product according to claim 8, wherein the content includes metadata variables that are associated with applications running on the data resources and/or indicate respective network configurations of the data resources.

17. The computer software product according to claim 8, wherein the content includes respective names and/or content of files stored in the data resources.

18. The computer software product according to claim 8, wherein the data resources include one or more databases, and wherein the content includes respective names of tables in the databases and/or respective names of fields in the tables.

19. The computer software product according to claim 8, wherein the instructions cause the processors to identify the content by:
   taking respective snapshots of the data resources, and
   mounting and then scanning the snapshots.

20. The computer software product according to claim 19, wherein scanning the snapshots includes scanning one or more predefined storage locations at which a particular application or type of application is typically installed.

* * * * *